US 12,032,655 B2

(12) United States Patent
Dellinger et al.

(10) Patent No.: US 12,032,655 B2
(45) Date of Patent: Jul. 9, 2024

(54) ASYNCHRONOUS DOCUMENT INGESTION AND ENRICHMENT SYSTEM

(71) Applicant: NOBLIS, INC., Reston, VA (US)

(72) Inventors: Nathan Dellinger, Reston, VA (US); David Peters, Reston, VA (US)

(73) Assignee: NOBLIS, INC., Reston, VA (US)

( * ) Notice: Subject to any disclaimer, the term of this patent is extended or adjusted under 35 U.S.C. 154(b) by 207 days.

(21) Appl. No.: 17/004,508

(22) Filed: Aug. 27, 2020

(65) Prior Publication Data

US 2021/0064708 A1 Mar. 4, 2021

Related U.S. Application Data

(60) Provisional application No. 62/894,142, filed on Aug. 30, 2019.

(51) Int. Cl.
| | |
|---|---|
| *G06F 17/40* | (2006.01) |
| *G06F 9/54* | (2006.01) |
| *G06F 16/27* | (2019.01) |
| *G06F 17/18* | (2006.01) |
| *H04L 51/18* | (2022.01) |
| *H04L 67/55* | (2022.01) |

(52) U.S. Cl.
CPC ............. *G06F 17/40* (2013.01); *G06F 9/544* (2013.01); *G06F 16/273* (2019.01); *G06F 17/18* (2013.01); *H04L 51/18* (2013.01); *H04L 67/55* (2022.05)

(58) Field of Classification Search
CPC ........ G06F 17/40; G06F 16/273; G06F 9/544; G06F 17/18; H04L 51/18; H04L 67/26
See application file for complete search history.

(56) References Cited

U.S. PATENT DOCUMENTS

| | | | | |
|---|---|---|---|---|
| 9,471,585 | B1* | 10/2016 | Theimer | ............... G06F 3/0641 |
| 9,794,135 | B2* | 10/2017 | Theimer | ................. H04L 41/24 |
| 2018/0027006 | A1* | 1/2018 | Zimmermann | ..... G06F 21/6218 |
| | | | | 726/11 |
| 2019/0095510 | A1* | 3/2019 | Cruise | ................... G06F 16/288 |
| 2019/0373083 | A1* | 12/2019 | Nucci | ................... H04L 63/062 |
| 2021/0034440 | A1* | 2/2021 | Arendt | ................ G06F 11/3086 |

OTHER PUBLICATIONS

Jay Kreps; Introducing Kafka Streams: Stream Processing Made Simple; Mar. 10, 2016; https://www.confluent.io/blog/introducing-kafka-streams-stream-processing-made-simple/; 18 pages (Year: 2016).*

(Continued)

*Primary Examiner* — Kevin L Young
*Assistant Examiner* — Kimberly L Jordan
(74) *Attorney, Agent, or Firm* — Morrison & Foerster LLP

(57) ABSTRACT

Provided are asynchronous data ingestion and enrichment systems and methods. The systems comprise a plurality of components (e.g., ingestion components, enrichment components, and/or publishing components). Instead of passing data from one component to another, the data is sent to a messaging queue that formats and hold the data until the subsequent component is ready to receive it. Additionally, each component comprises a central microservice and a plurality of instances, the central microservice configured to communicate with each instance of the plurality of instances.

19 Claims, 3 Drawing Sheets

(56) References Cited

OTHER PUBLICATIONS

"Confluent REST Proxy for Kafka" located at https://web.archive.org/web/20190805234414/https://github.com/confluentinc/kafka-rest visited on Aug. 5, 2019. (3 pages).

Alley. (Apr. 26, 2018) "Open Source ETL Tools Comparison," located at https://web.archive.org/web/20181230210155/https://www.alooma.com/blog/open-source-etl-tools-comparison visited on Dec. 30, 2018. (7 pages).

Beiske. (Sep. 14, 2014) "ZooKeeper—The King of Coordination," located at https://web.archive.org/web/20160410091628/https://www.elastic.co/blog/found-zookeeper-king-of-coordination visited on Apr. 10, 2016. (13 pages).

Kreps. (Feb. 25, 2015) "Why Avro for Kafka Data?," located at https://web.archive.org/web/20190627205445/https://www.confluent.io/blog/avro-kafka-data/ visited on Jun. 27, 2019. (10 pages).

Mytton. (Jan. 19, 2016) "How to Monitor Kafka," located at https://web.archive.org/web/20190617072815/https://blog.serverdensity.com/how-to-monitor-kafka/ visited on Jun. 17, 2019. (5 pages).

Rao. (Mar. 12, 2015) "How to choose the number of topics/partitions in a Kafka cluster?," located at https://web.archive.org/web/20190711040744/https://www.confluent.io/blog/how-choose-number-topics-partitions-kafka-cluster/ visited on Jul. 11, 2019. (6 pages).

Sookocheff. (Sep. 25, 2015) "Kafka in a Nutshell," located at https://web.archive.org/web/20190723082234/https:/sookocheff.com/post/kafka/kafka-in-a-nutshell/ visited on Jul. 23, 2019. (10 pages).

Stopford. (Nov. 9, 2017) "Building a Microservices Ecosystem with Kafka Streams and KSQL," located at https://web.archive.org/web/20190616091102/https:/www.confluent.io/blog/building-a-microservices-ecosystem-with-kafka-streams-and-ksql/ visited on Jun. 16, 2019. (22 pages).

"Wurstmeister/Kafka" located at https://web.archive.org/web/20180916083335if_/https:/hub.docker.com/r/wurstmeister/kafka/ visited on Sep. 16, 2018. (6 pages).

\* cited by examiner

ASYNCHRONOUS DOCUMENT INGESTION AND ENRICHMENT SYSTEM

REFERENCE TO RELATED APPLICATIONS

This application claims the priority of U.S. Provisional Application No. 62/894,142, filed Aug. 30, 2019, the entire contents of which are incorporated herein by reference.

FIELD OF THE DISCLOSURE

This relates to document ingestion systems, and more particularly, to asynchronous document ingestion and enrichment systems.

BACKGROUND OF THE DISCLOSURE

Data ingestion includes identifying, obtaining, and importing data from the internet, local archives, databases, and/or file systems for immediate and/or later use. A data ingestion pipeline is the overall infrastructural tool that executes each of these actions—identifying, obtaining, importing. Various data ingestion pipelines may be configured to structure the targeted data based on a specific query.

Synchronous processing and messaging often causes bottlenecks in the work flow. For example, each component in the synchronous process may be directly relying on an output from another component in the system.

SUMMARY OF THE DISCLOSURE

Provided are asynchronous data ingestion and enrichment systems. In particular, asynchronous data ingestion and enrichment systems provided herein may include a plurality of components that are individually scalable and configurable depending on demand.

In contrast the synchronous systems described above, data can be passed between individual components asynchronously (e.g., via a message broker) in the asynchronous data ingestion and enrichment systems provided herein. By processing documents and data using an asynchronous system, each component of the system can operate/work individually without consideration for the time it takes another component to execute a job. Specifically, asynchronous systems herein use a messaging queue to format and hold a document once passed through a first component until a second component is ready to receive that document.

Further, each component of a synchronous system described herein may include a central microservice that coordinates work amongst a number of instances. With a central microservice, any single instance can malfunction without affecting the workflow. For example, if an instance goes down, the central microservice can reroute the work assigned to another instance that is still operating. When the first instance comes back online, it can communicate with the central microservice to determine where to jump back in to the work flow.

In some embodiments, an asynchronous data ingestion and enrichment system is provided, the system comprising: a plurality of ingestion components, wherein each ingestion component of the plurality of ingestion components comprises an ingestion central microservice configured to manage a plurality of ingestion instances; a plurality of enrichment components, wherein each enrichment component of the plurality of enrichment components comprises an enrichment central microservice configured to manage a plurality of enrichment instances; a plurality of publishing components, wherein each publishing component of the plurality of publishing components comprises a publishing central microservice configured to manage a plurality of publishing instances; and an administrative service configured to instruct each of the ingestion components to publish to one or more of a plurality of messaging queues, instruct each of the enrichment components to consume from one or more of the plurality of messaging queues and publish to one or more of the plurality of messaging queues, and instruct each of the publishing components to consume from one or more of the plurality of messaging queues.

In some embodiments of the system, managing the plurality of ingestion instances comprises at least one of instantiating or terminating of one or more ingestion instances of the plurality of ingestion instances.

In some embodiments of the system, managing the plurality of enrichment instances comprises at least one of instantiating or terminating of one or more enrichment instances of the plurality of enrichment instances.

In some embodiments of the system, managing the plurality of publishing instances comprises at least one of instantiating or terminating of one or more publishing instances of the plurality of publishing instances.

In some embodiments of the system, the administrative service is configured to instruct two or more enrichment components of the plurality of enrichment components to operate in parallel.

In some embodiments of the system, the instruction to operate in parallel comprises an instruction for the two or more enrichment components to each consume from a first messaging queue of the plurality of messaging queues.

In some embodiments of the system, the administrative service is configured to instruct two or more enrichment components of the plurality of enrichment components to operate in series.

In some embodiments of the system, the instruction to operate in series comprises an instruction for a first enrichment component of the two or more enrichment components to publish to the first messaging queue of the plurality of messaging queues, and comprises an instruction for a second enrichment component of the two or more enrichment components to consume from the first messaging queue of the plurality of messaging queues.

In some embodiments of the system, the administrative service is configured to track one or more metrics for one of more components selected from: the plurality of ingestion components, the plurality of enrichment components, and the plurality of publishing components.

In some embodiments of the system, the one or more metrics comprise one or more of: a data throughput metric, a number of documents processed, a data traffic metric, a workload metric, and a document processing rate metric.

In some embodiments of the system, the administrative service is configured to instantiate or terminate one or more instances of one or more of the tracked components based on one or more of the tracked metrics.

In some embodiments of the system, the administrative service is configured to ensure that a dataset is consumed by only a single component.

In some embodiments of the system, the administrative service is configured to: detect that a first instance of one of the pluralities of instances has ceased performance of a task; and in response to detecting that the first instance has ceased performance, instruct a second instance of the one of the pluralities of instances to resume performance of a task.

In some embodiments of the system, resuming performance of the task comprises resuming performance without duplicating work on the task previously performed by the first instance.

In some embodiments, a method for asynchronous data ingestion and enrichment system is provided, the method performed at a system comprising: a plurality of ingestion components, wherein each ingestion component of the plurality of ingestion components comprises an ingestion central microservice configured to manage a plurality of ingestion instances; a plurality of enrichment components, wherein each enrichment component of the plurality of enrichment components comprises an enrichment central microservice configured to manage a plurality of enrichment instances; a plurality of publishing components, wherein each publishing component of the plurality of publishing components comprises a publishing central microservice configured to manage a plurality of publishing instances; and an administrative service; the method comprising: instructing, by the administrative service, each of the ingestion components to publish to one or more of a plurality of messaging queues, instructing, by the administrative service, each of the enrichment components to consume from one or more of the plurality of messaging queues and publish to one or more of the plurality of messaging queues, and instructing, by the administrative service, each of the publishing components to consume from one or more of the plurality of messaging queues.

In some embodiments of the method, managing the plurality of ingestion instances comprises at least one of instantiating or terminating of one or more ingestion instances of the plurality of ingestion instances.

In some embodiments of the method, managing the plurality of enrichment instances comprises at least one of instantiating or terminating of one or more enrichment instances of the plurality of enrichment instances.

In some embodiments of the method, managing the plurality of publishing instances comprises at least one of instantiating or terminating of one or more publishing instances of the plurality of publishing instances.

In some embodiments of the method, the method comprises instructing, by the administrative service, two or more enrichment components of the plurality of enrichment components to operate in parallel.

In some embodiments of the method, the method comprises instructing, by the administrative service, two or more enrichment components of the plurality of enrichment components to operate in series.

In some embodiments, a non-transitory computer-readable storage medium for asynchronous data ingestion and enrichment system is provided, the non-transitory computer-readable storage medium storing instructions configured to be executed by one or more processors of a system comprising: a plurality of ingestion components, wherein each ingestion component of the plurality of ingestion components comprises an ingestion central microservice configured to manage a plurality of ingestion instances; a plurality of enrichment components, wherein each enrichment component of the plurality of enrichment components comprises an enrichment central microservice configured to manage a plurality of enrichment instances; a plurality of publishing components, wherein each publishing component of the plurality of publishing components comprises a publishing central microservice configured to manage a plurality of publishing instances; and an administrative service; the instructions causing the system to: instruct, by the administrative service, each of the ingestion components to publish to one or more of a plurality of messaging queues, instruct, by the administrative service, each of the enrichment components to consume from one or more of the plurality of messaging queues and publish to one or more of the plurality of messaging queues, and instruct, by the administrative service, each of the publishing components to consume from one or more of the plurality of messaging queues.

In some embodiments of the non-transitory computer-readable storage medium, managing the plurality of ingestion instances comprises at least one of instantiating or terminating of one or more ingestion instances of the plurality of ingestion instances.

In some embodiments of the non-transitory computer-readable storage medium, managing the plurality of enrichment instances comprises at least one of instantiating or terminating of one or more enrichment instances of the plurality of enrichment instances.

In some embodiments of the non-transitory computer-readable storage medium, managing the plurality of publishing instances comprises at least one of instantiating or terminating of one or more publishing instances of the plurality of publishing instances.

In some embodiments of the non-transitory computer-readable storage medium, the instructions cause the system to instruct, by the administrative service, two or more enrichment components of the plurality of enrichment components to operate in parallel.

In some embodiments of the non-transitory computer-readable storage medium, the instructions cause the system to instruct, by the administrative service, two or more enrichment components of the plurality of enrichment components to operate in series.

In some embodiments, any one or more features of the system, method, and/or computer readable storage-medium described above may be combined in whole or in part with each other and/or with any other features or aspects disclosed herein.

BRIEF DESCRIPTION OF THE FIGURES

Various embodiments are described with reference to the accompanying figures, in which.

DETAILED DESCRIPTION OF THE DISCLOSURE

Described herein are asynchronous data ingestion and enrichment systems. In particular, asynchronous data ingestion and enrichment systems provided herein may be able to minimize bottlenecks, allow various components to operate independently of each other, and, in the event a component or portion of a component goes down, continue processing documents wherein the non-functioning component or portion left off.

Data ingestion and enrichment systems herein obtain data from one or more external sources by ingesting the data using one or more components. In some embodiments, systems can enrich the data using one or more components.

After data is enriched, it may be published to a datastore. Each of these individual steps of the disclosed asynchronous data ingestion and enrichment systems are described in detail below. Additionally, after ingestion and/or enrichment, the data/document may be passed to a messaging queue to be formatted and held until a subsequent processing module (e.g., component) is ready to receive it.

Figure 1:
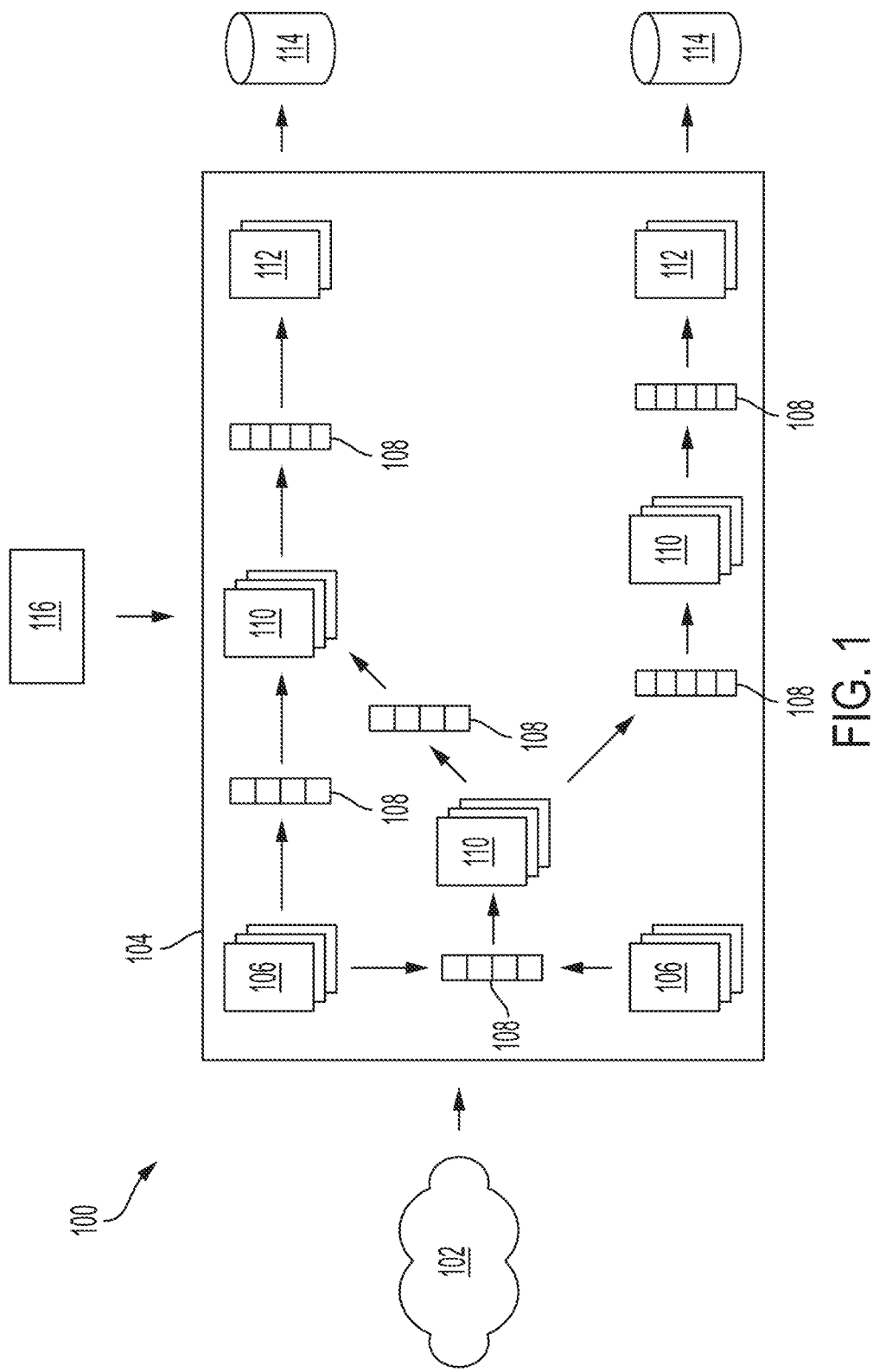
FIG. 1 provides a schematic of an asynchronous data ingestion and enrichment process, according to some embodiments.

FIG. 1 shows a simplistic diagram of an asynchronous data ingestion and enrichment system 100 according to some embodiments. As shown, system 100 can include external sources 102, interface 104, ingestion components 106, messaging queues 108, enrichment components 110, publishing components 112, datastores 114, and administrative service 116. Ingestion components 106, enrichment components 110, publish components 112, and/or messaging queue 108 may be configured in series and/or parallel.

Systems provided herein may ingest (e.g., obtain) data and/or documents from one or more external sources 102. In particular, ingestion components 106 may ingest data from external sources 102. Example external sources from which data and/or documents may be obtained can include RSS feeds, dark web content, web scraping, social media, raw document ingestion, etc. In some embodiments, an individual ingestion component 106 may be dedicated to a certain type of external source 102. For example, a "Twitter ingest" may be an ingestion component 106 for ingesting data only from Twitter social media sources.

In some embodiments, external source 102 may include an RSS feed. To ingest RSS feed data, ingestion component 106 takes RSS feed links as a input and produces output content based on a web crawl to the objects published in the RSS feed. An ingestion component 106 specific to RSS feeds may interpret a feed and extract basic metadata (e.g., authors, dates published, etc.) and relevant objects that are published within the feed.

In some embodiments, external source 102 may include social media, such as Twitter. To ingest Twitter data, Twitter must be crawled using a developer API account. This information is used as an input in an ingestion component 106 specific to Twitter. An ingestion component 106 can extract basic metadata such as an author and timestamp in addition to the content of the tweet itself.

In some embodiments, each targeted external source 102 (e.g., RSS feed, social media platform A, social media platform B, etc.) may have a dedicated ingestion component 106. For example, data may be ingested from external sources in real time. In some embodiments, data that is ingested in real time may be imported into system 100 as it is emitted by external source 102. In some embodiments, data may be ingested by systems provided herein in batches. Data that is ingested in batches is imported in discrete portions at period intervals of time. Once ingested, data may be processed (e.g., by enrichment components 108 and/or publish components 110) immediately, or may be held in storage until processed at a later time.

Ingestion component 106 can import data into interface 104 of system 100. Interface 104 may include a clustering and/or scheduling tool for various components (e.g., ingestion component 106, enrichment component 110, publishing component 112). In some embodiments, interface 104 may include Docker Swarm, a feature of Docker. Docker is an open source software platform for creating, deploying, and managing virtualized application containers on a common operating system. A specific container is a packaged unit of software that includes code and all dependencies such that the application can run from one computing environment to another. In particular, a Docker container is a standalone executable package of software that includes everything needed to run in an application, such as code, runtime, system tools, system libraries, and settings. In some embodiments, container platforms other than Docker may be used, such as CoreOS rkt, LXD, or OpenVZ. Docker Swarm can allow a cluster of Docker containers to be used in a single system. In particular, Docker Swarm can enable a user to scale up container deployments to multiple hosts.

Docker Swarm is a specific tool for organizing Docker containers. In some embodiments, Docker Swarm may be used to scale system 100 up or down based on the processing demand. In some embodiments, each component (e.g., ingestion component 106, enrichment component 110, and publishing component 110) running in Docker Swarm may have multiple instances (e.g., instances 222 of FIG. 2) running on separate servers or virtual machines such that the processing is distributed across a cloud infrastructure.

In some embodiments, Docker Swarm may be used to add or subtract instances 222 from an individual component 220 as needed. Scaling may be manually executed by a user. In some embodiments, scaling may be automatically executed by the asynchronous system in conjunction with central microservice 220, based on tracked metrics. For example, if the asynchronous system recognizes that a specific component 220 is running at capacity (e.g., based on tracked metrics such as data throughput), an additional instance 222 may be added to that specific component 220 to help alleviate some of the demand.

In some embodiments, after data is ingested by ingestion container 106 from external sources 102, the output of ingestion component 106 may be passed to one or more messaging queue 108. In some embodiments, Kafka 108 may be used as messaging queue 108. Other suitable messaging queues may include RabbitMQ or Active MQ. An output from one or more ingestion components 106 may be sent to messaging queue 108 to be held until a subsequent component is ready to receive it as an input. In some embodiments, an output from a first ingestion component 106 may be sent to a single messaging queue 108. In some embodiments, an output from a first ingestion component 106 may be sent to two or more messaging queues 108. In some embodiments, system 100 comprises a single messaging queue 108 that can format and store data between each pair of components configured to pass data between each other.

As described above, Kafka may be used as messaging queue 108. Kafka is a distributed streaming platform that functions as a producer/consumer messaging queue. In asynchronous systems provided herein, Kafka may be used as an intermediary, allowing each component of an asynchronous data ingestion and enrichment system to operate independently of each other. Thus, instead of a first component (e.g., ingestion component 106 and/or enrichment component 110) sending its output to a second component (e.g., enrichment component 110 and/or publishing component 112), the first component can send its output directly to the Kafka intermediary. The Kafka intermediary can hold the first component's output until a second component is ready to receive it for processing. Compared to other messaging queues, Kafka may be more fault tolerant and able to accommodate a higher throughput.

In some embodiments, messaging queue 108 may work with one or more specific formatting services to format and store the outputs of ingestion components 106. Apache Avro™ is one such formatting service. Avro™ is a row-based storage format that can be used as a serialization platform. Specifically, Avro™ stores data in JSON format, allowing the data to be easily read and interpreted by any program. The data itself is stored in binary format. Other formatting services that may be used include Thrift and Protocol Buffers. However, JSON format is somewhat human-readable, making it easier to work with when debugging. JSON parsers also exist in many languages, making it much easier to work with than many other formats.

After a document and/or data is ingested with ingestion component 106 and formatted/held by messaging queue 108, the information may be sent to one or more of a plurality of enrichment components 110. Each individual enrichment component 110 can pull from a messaging queue 108 an input (e.g., a unit of data ingested and held by the Kafka intermediary). In some embodiments, enrichment component 110 may pull from any one of a plurality of messaging queues 108, or any one of a plurality of queues in a single messaging queue 108. In some embodiments, a specific enrichment component 110 may pull from only a single messaging queue 108.

Within a given enrichment component 110, enrichment information may be added to, removed from, or modified in the JSON object, or unit of data, before being passed to the next messaging queue 108, enrichment component 110, and/or publishing component 112. For example, if an enrichment component 110 is a translator, it may add enrichment information to the JSON object that includes whether the source material was able to be translated, what the source language was, and what the translated language is. In some embodiments, an enrichment component 110 may include a natural language processing (NLP) algorithm. An NLP algorithm may be configured to operate on both the source language and the translated language.

In some embodiments, enrichment component 110 may include a geographical enrichment component. For example, a geographical enrichment component may search the body field of ingested material for latitude and/or longitude information. In some embodiments, a geographical component may use an NLP entity extraction to find geographical locations. This information would be attached to the data object and passed to the next component (e.g., enrichment component 110 or publish component 112).

Once an enrichment component 110 has enriched data input (e.g., JSON object), the enrichment component 110 may pass the enriched data to one or more of a plurality of messaging queues 108. The enriched data may reside in messaging queue 108 until another enrichment component 110 and/or a publishing component 112 is ready to receive the enriched data.

System 100 can include one or more publishing components 112. A publishing component 112 may send the processed data to the local environment in a datastore 114, where the data can be accessed by any number of local applications. In some embodiments, datastore 114 may be a relational database or a NoSQL database. For example, a relational database may be used to link objects together. In some cases, a relational database may allow for the use of primary keys and foreign keys to link datasets, allowing for faster query times when querying for data.

In some embodiments, system 100 may include administration service 116.

Administration service 116 can control the scalability and/or configurability of the various ingestion components 106, enrichment components 110, publishing components 112, and/or messaging queues 108. Administration service 116 may be, more or less, an external microservice of system 100. For example, administration service 116 may be in communication with each ingestion component 106, each enrichment component 110, and each publishing component 112. In some embodiments, administration service 116 may be in communication with each instance of each ingestion component 106, each instance of each enrichment component 110, and each instance of each publishing component 112.

In some embodiments, administration service 116 may be configured for inter-component messaging between any two of the ingestion components 106, enrichment components 110, and/or publishing components 112. In some embodiments, each component of the ingestion components 106, enrichment components 110, and/or publishing components 112 may operate completely independently of each other, without any inter-component messaging.

Figure 2:
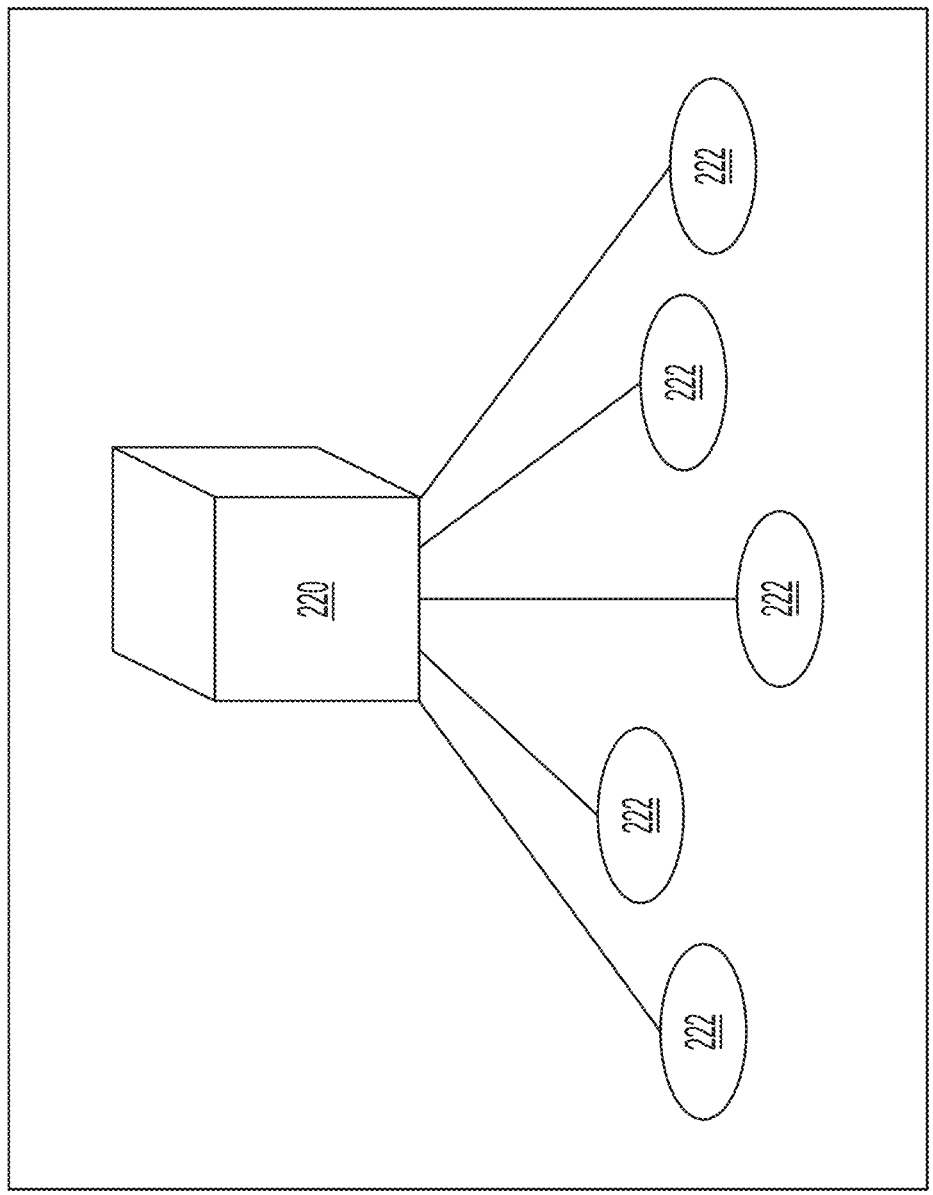
FIG. 2 shows a schematic of a component of an asynchronous data ingestion and enrichment process, according to some embodiments.

FIG. 2 shows a schematic of a single component 200. Component 200 may be an ingestion component (e.g., ingestion component 106 of FIG. 1), an enrichment component (e.g., enrichment component 110 of FIG. 1), and/or a publishing component (e.g., publishing component 112 of FIG. 1). Component 200 may include a central microservice 220 and a plurality of instances 222.

In some embodiments, the plurality of instances 222 may be part of a consumer group in Kafka. Sometimes, it may be necessary to coordinate the work within the consumer group, or between each instance 222 of the plurality of instances 222. For example, if there is a plurality of documents/data in a messaging queue, and the plurality of instances 222 of component 200 consumes from this particular messaging queue, Kafka may distribute the data/documents amongst each instance 222 of the plurality of instances 222 evenly. Kafka may also guarantee that only one consumer receives a particular "message," or dataset. Collecting metrics based on the number of documents processed, for example, may also require coordination between each of the individual instances 222 of component 200. Accordingly, each component 200 of an asynchronous system disclosed herein (e.g., system 100 of FIG. 1) comprises a central microservice 220. Central microservice 220 can handle the coordination between each instance 222 of the plurality of instances 222.

Additionally, each central microservice 220 can continue operating in the event a single instance 222 goes down. For example, an instance 222 can go down without the system losing progress on the document it was working on at the time the first instance 222 stopped operating. Another instance 222 of the plurality of instances 222 will pick up where the first instance 222 left off when it stopped. When the first instance 222 comes back online, it can communicate with central microservice 220 to determine where it should go back to work in the process. Once an instance 222 finishes a job, it can communicate this to central microservice 220. Thus, central microservice 220 can keep track of where each instance 222 and/or where its respective component 200 is within the data ingestion and enrichment process.

Central microservice 220 may communicate with each individual instance 222 of the plurality of instances 222. In some embodiments, central microservice 220 can collect metrics of each instance 222. For example, central microservice 220 may collect metrics related to data traffic (e.g., workload, number of documents handled, rate at which the documents are being handled). In some embodiments, metrics are logged and stored. The gathered metrics may be connected with a user interface, allowing a user to access the metrics.

In essence, central microservice 220 is a communication middleman between an asynchronous data ingestion and enrichment system (e.g., system 100 of FIG. 1) and each instance of component 200. Thus, instead of a disclosed asynchronous system communicating with each individual instance 222, central microservice 220 manages communication between instances 222 and its asynchronous system. In some embodiments, central microservice 220 may request additional work from the asynchronous data ingestion and enrichment system.

In some embodiments, asynchronous systems provided herein may use a remote procedure call (RPC) mechanism for communicating between central microservice 220 and each instance 222. An RPC mechanism is a way of exposing low level procedure (e.g., methods or functions) to other services such that they can be called. For example, For example, an external source (e.g., external source 102 of FIG. 1) may be RSS feeds that include a plurality of URLs. The plurality of URLs need to be looked up to pull articles for ingestion. Central microservice 220 may call back to the asynchronous system (e.g., system 100 of FIG. 1) to get a list of the RSS feeds that need to be parsed. Thus, central microservice 220 may coordinate the distributional work of each instance 222 of each component 200.

In another example, component 200 may include a de-duplication algorithm. In some embodiments, central microservice 220 may call back to the system (e.g., system 100 of FIG. 1) and/or a centralized application programming interface (API) to determine whether a particular document has already been "seen."

Each instance of the plurality of instances 222 can work in a distributed fashion to perform the function work of component 200. Each instance 222 may pull its own set of data/documents from a messaging queue (e.g., messaging queue 108 of FIG. 1). In particular, asynchronous data ingestion and enrichment systems disclosed herein may operate within the platform Kafka.

Figure 3:
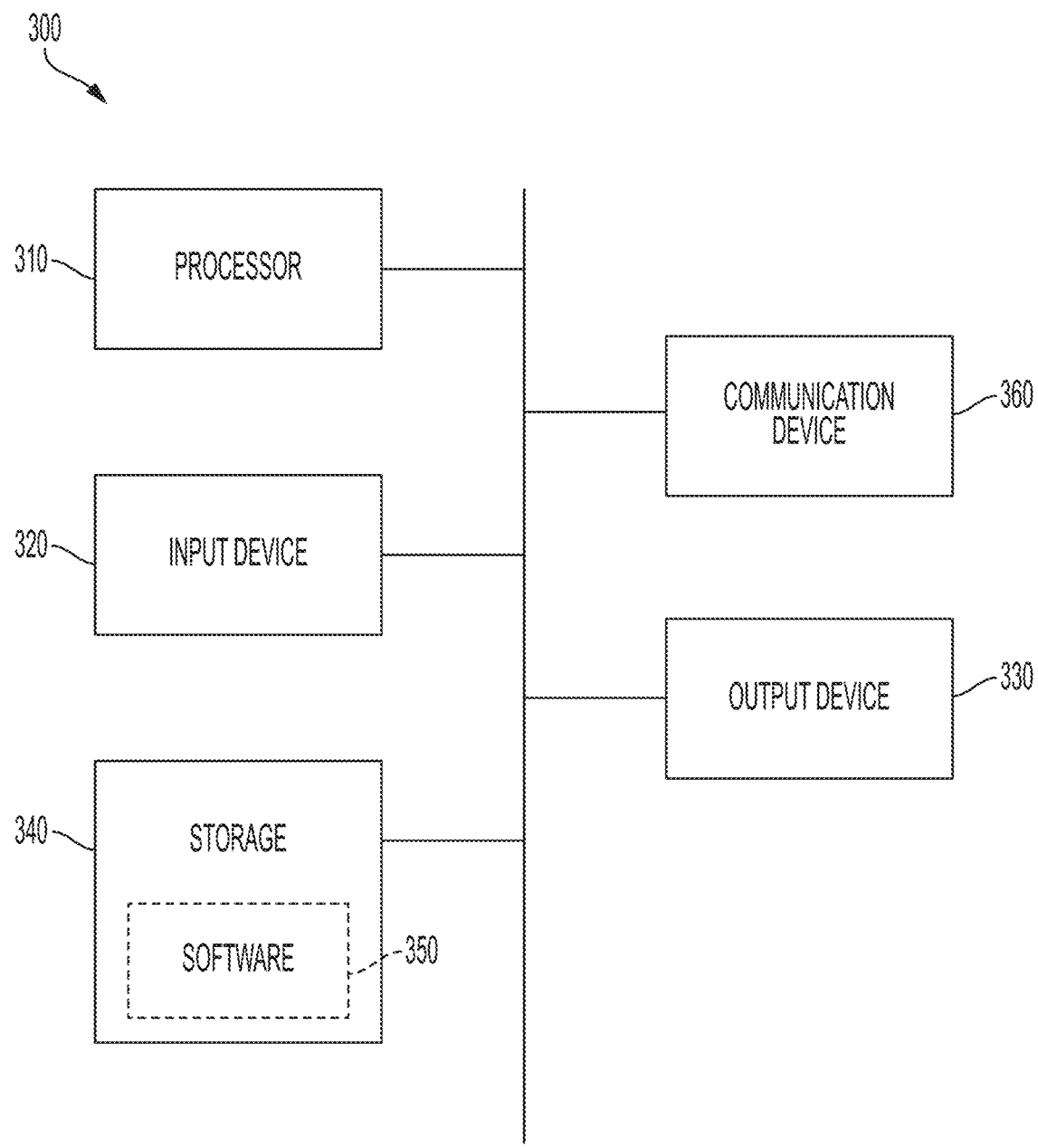
FIG. 3 illustrates an example of a computing device according to some embodiments.

FIG. 3 illustrates an example of a computer, according to some embodiments. Computer 300 can be a component of an asynchronous data ingestion and enrichment system according to the systems and methods described above, such as system 100 of FIG. 1, or can include the entire system itself. In some embodiments, computer 300 may execute a method for asynchronously ingesting and enriching data.

Computer 300 can be a host computer connected to a network. Computer 300 can be a client computer or a server. As shown in FIG. 3, computer 300 can be any suitable type of microprocessor-based device, such as a personal computer, workstation, server, or handheld computing device, such as a phone or tablet. The computer can include, for example, one or more of processor 310, input device 320, output device 330, storage 340, and communication device 360. Input device 320 and output device 330 can correspond to those described above and can either be connectable or integrated with the computer.

Input device 320 can be any suitable device that provides input, such as a touch screen or monitor, keyboard, mouse, or voice-recognition device. Output device 330 can be any suitable device that provides an output, such as a touch screen, monitor, printer, disk drive, or speaker.

Storage 340 can be any suitable device that provides storage, such as an electrical, magnetic, or optical memory, including a random access memory (RAM), cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly.

Storage 340 can be a non-transitory computer-readable storage medium comprising one or more programs, which, when executed by one or more processors, such as processor 310, cause the one or more processors to execute methods described herein.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can include a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. An asynchronous data ingestion and enrichment system comprising one or more processors and memory storing instructions executable by the one or more processors to:
  instantiate a plurality of ingestion software processing modules, wherein each ingestion software processing module of the plurality of ingestion software processing modules comprises an ingestion central microservice configured to manage a plurality of ingestion instances;
  instantiate a plurality of enrichment software processing modules, wherein each enrichment software processing module of the plurality of enrichment software processing modules comprises an enrichment central microservice configured to manage a plurality of enrichment instances;
  instantiate a plurality of publishing software processing modules, wherein each publishing software processing module of the plurality of publishing software processing modules comprises a publishing central microservice configured to manage a plurality of publishing instances;
  instruct each of the ingestion software processing modules to publish to one or more of a plurality of messaging queues, wherein at least one of the ingestion software processing modules are configured to apply a de-duplication algorithm, wherein applying the de-duplication algorithm comprises transmitting a message from the enrichment central microservice to an Application Processing Interface ("API") to determine whether a document has been previously processed by the system and further comprises the enrichment central microservice calling back to at least one other component of the system to determine whether the document has been previously processed;
  instruct each of the enrichment software processing modules to consume from one or more of the plurality of messaging queues and publish to one or more of the plurality of messaging queues, wherein at least one of the enrichment software processing modules is configured such that, in response to a first one of the plurality of enrichment instances of the enrichment software processing module ceasing operation, a second one of the enrichment instances of the plurality of enrichment instances resumes operation without duplication of work; and
  instruct each of the publishing software processing modules to consume from one or more of the plurality of messaging queues.

2. The system of claim 1, wherein managing the plurality of ingestion instances comprises at least one of instantiating or terminating of one or more ingestion instances of the plurality of ingestion instances.

3. The system of claim 1, wherein managing the plurality of enrichment instances comprises at least one of instantiating or terminating of one or more enrichment instances of the plurality of enrichment instances.

4. The system of claim 1, wherein managing the plurality of publishing instances comprises at least one of instantiating or terminating of one or more publishing instances of the plurality of publishing instances.

5. The system of claim 1, wherein an administrative service is configured to instruct two or more enrichment software processing modules of the plurality of enrichment software processing modules to operate in parallel.

6. The system of claim 5, wherein the instruction to operate in parallel comprises an instruction for the two or more enrichment software processing modules to each consume from a first messaging queue of the plurality of messaging queues.

7. The system of claim 1, wherein an administrative service is configured to instruct two or more enrichment software processing modules of the plurality of enrichment software processing modules to operate in series.

8. The system of claim 7, wherein the instruction to operate in series comprises an instruction for a first enrichment software processing module of the two or more enrichment software processing modules to publish to the first messaging queue of the plurality of messaging queues, and comprises an instruction for a second enrichment software processing module of the two or more enrichment software processing modules to consume from the first messaging queue of the plurality of messaging queues.

9. The system of claim 1, wherein an administrative service is configured to track one or more metrics for one of more software processing modules selected from: the plurality of ingestion software processing modules, the plurality of enrichment software processing modules, and the plurality of publishing software processing modules.

10. The system of claim 9, wherein the one or more metrics comprise one or more of: a data throughput metric, a number of documents processed, a data traffic metric, a workload metric, and a document processing rate metric.

11. The system of claim 9, wherein the administrative service is configured to instantiate or terminate one or more instances of one or more of the one or more software processing modules based on one or more of the tracked metrics.

12. The system of claim 1, wherein an administrative service is configured to ensure that a dataset is consumed by only a single software processing module.

13. A method for asynchronous data ingestion and enrichment system, the method performed at a system comprising one or more processors and memory storing instructions for executing the method, the method comprising:
  instantiating a plurality of ingestion software processing modules, wherein each ingestion software processing module of the plurality of ingestion software processing modules comprises an ingestion central microservice configured to manage a plurality of ingestion instances;
  instantiating a plurality of enrichment software processing modules, wherein each enrichment software processing module of the plurality of enrichment software processing modules comprises an enrichment central microservice configured to manage a plurality of enrichment instances;
  instantiating a plurality of publishing software processing modules, wherein each publishing software processing module of the plurality of publishing software processing modules comprises a publishing central microservice configured to manage a plurality of publishing instances; and
  instructing each of the ingestion software processing modules to publish to one or more of a plurality of messaging queues, wherein at least one of the ingestion software processing modules are configured to apply a de-duplication algorithm, wherein applying the de-duplication algorithm comprises transmitting a message from the enrichment central microservice to an Application Processing Interface ("API") to determine whether a document has been previously processed by the system and further comprises the enrichment central microservice calling back to at least one other component of the system to determine whether the document has been previously processed;
  instructing each of the enrichment software processing modules to consume from one or more of the plurality of messaging queues and publish to one or more of the plurality of messaging queues, wherein at least one of the enrichment software processing modules is configured such that, in response to a first one of the plurality of enrichment instances of the enrichment software processing module ceasing operation, a second one of the enrichment instances of the plurality of enrichment instances resumes operation without duplication of work; and
  instructing each of the publishing software processing modules to consume from one or more of the plurality of messaging queues.

14. The method of claim 13, wherein managing the plurality of ingestion instances comprises at least one of instantiating or terminating of one or more ingestion instances of the plurality of ingestion instances.

15. The method of claim 13, wherein managing the plurality of enrichment instances comprises at least one of instantiating or terminating of one or more enrichment instances of the plurality of enrichment instances.

16. The method of claim 13, wherein managing the plurality of publishing instances comprises at least one of instantiating or terminating of one or more publishing instances of the plurality of publishing instances.

17. The method of claim 13, wherein the method comprises instructing, by an administrative service, two or more enrichment software processing modules of the plurality of enrichment software processing modules to operate in parallel.

18. The method of claim 13, wherein the method comprises instructing, by an administrative service, two or more enrichment software processing modules of the plurality of enrichment software processing modules to operate in series.

19. A non-transitory computer-readable storage medium for asynchronous data ingestion and enrichment system, the non-transitory computer-readable storage medium storing instructions configured to be executed by one or more processors of a system comprising one or more processors configured to cause the system to:
  instantiate a plurality of ingestion software processing modules, wherein each ingestion software processing module of the plurality of ingestion software processing modules comprises an ingestion central microservice configured to manage a plurality of ingestion instances;
  instantiate a plurality of enrichment software processing modules, wherein each enrichment software processing module of the plurality of enrichment software processing modules comprises an enrichment central microservice configured to manage a plurality of enrichment instances;
  instantiate a plurality of publishing software processing modules, wherein each publishing software processing module of the plurality of publishing software processing modules comprises a publishing central microservice configured to manage a plurality of publishing instances; and
  instruct each of the ingestion software processing modules to publish to one or more of a plurality of messaging queues, wherein at least one of the ingestion software processing modules are configured to apply a de-duplication algorithm, wherein applying the de-duplication algorithm comprises transmitting a message from the enrichment central microservice to an Application Processing Interface ("API") to determine whether a document has been previously processed by the system and further comprises the enrichment central microservice calling back to at least one other component of the system to determine whether the document has been previously processed;
  instruct each of the enrichment software processing modules to consume from one or more of the plurality of messaging queues and publish to one or more of the plurality of messaging queues, wherein at least one of the enrichment software processing modules is configured such that, in response to a first one of the plurality of enrichment instances of the enrichment software processing module ceasing operation, a second one of the enrichment instances of the plurality of enrichment instances resumes operation without duplication of work; and
  instruct each of the publishing software processing modules to consume from one or more of the plurality of messaging queues.

* * * * *